No. 818,179. PATENTED APR. 17, 1906.
S. T. LIPSEY.
SAW SWAGE.
APPLICATION FILED MAY 5, 1905.
2 SHEETS—SHEET 1.
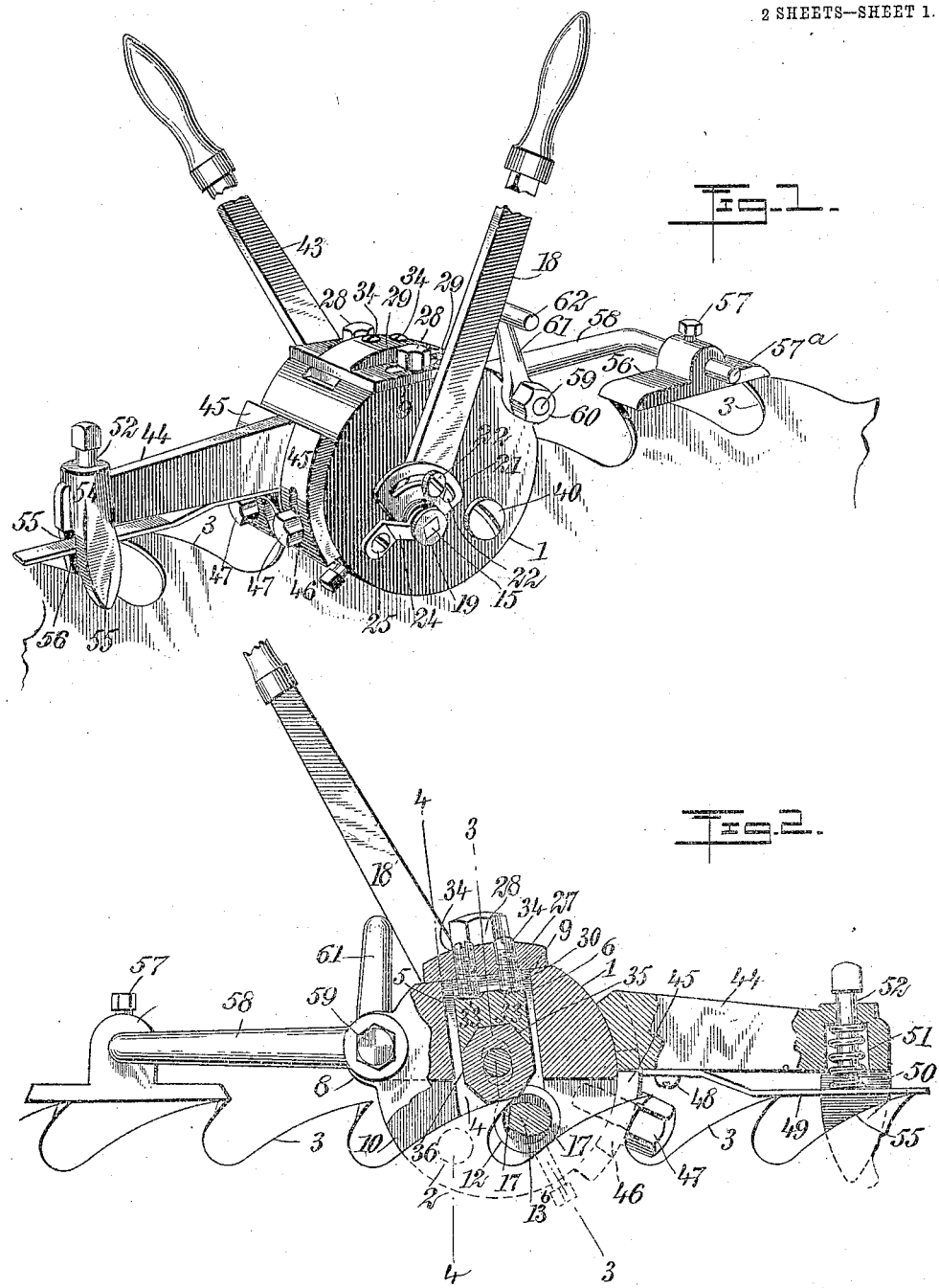
WITNESSES:
INVENTOR
Samuel T. Lipsey
BY
ATTORNEYS No. 818,179. PATENTED APR. 17, 1906.
S. T. LIPSEY.
SAW SWAGE.
APPLICATION FILED MAY 5, 1905.
2 SHEETS—SHEET 2.
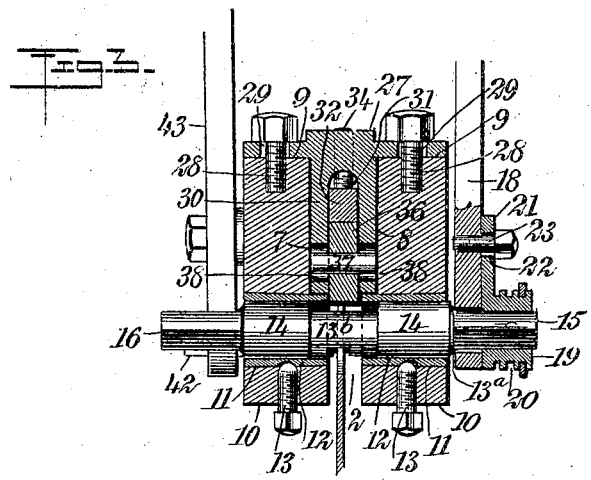
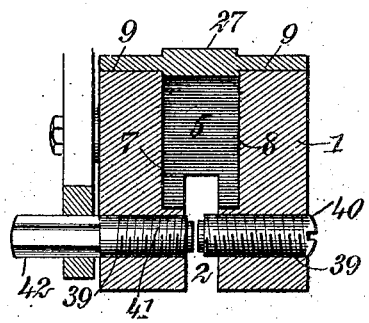
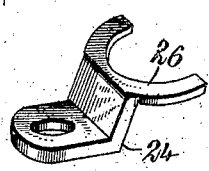
WITNESSES:
INVENTOR
Samuel T. Lipsey
BY
ATTORNEYS

UNITED STATES PATENT OFFICE.

SAMUEL TIMOTHY LIPSEY, OF GEORGETOWN, SOUTH CAROLINA.

SAW-SWAGE.

No. 818,179.  Specification of Letters Patent.  Patented April 17, 1906.

Application filed May 5, 1905. Serial No. 258,935.

*To all whom it may concern:*

Be it known that I, SAMUEL TIMOTHY LIPSEY, a citizen of the United States, and a resident of Georgetown, in the county of Georgetown and State of South Carolina, have invented a new and Improved Saw-Swage, of which the following is a full, clear, and exact description.

This invention relates to saw-swages; and it consists, substantially, in the details of construction and combinations of parts hereinafter more particularly described, and pointed out in the claims.

One of the principal objects of the invention is to provide a saw-swage adapted alike to the swaging of the teeth of band-saws, gang-saws, and circular saws irrespective of the gage thereof and also to provide means for overcoming numerous disadvantages and objections encountered in the use of many saw-swages hitherto devised with like ends in view.

A further object is to provide a saw-swage which is thoroughly effective and reliable for its purpose besides being light in weight and strong and durable and capable of being easily and quickly adjusted and manipulated.

A still further object is to provide a saw-swage which is not liable to get out of order nor become easily distorted or dislocated in any of its parts and one also which possesses the capacity for long and repeated service.

The above and additional objects are attained by means substantially such as are illustrated in the accompanying drawings, in which—

Figure 1 is a view in perspective of a saw-swage embodying my improvements, a portion of a saw being shown in position therein for the carrying out of the swaging operations. Fig. 2 is a side view thereof in part vertical section. Fig. 3 is a sectional view on the line 3 3 of Fig. 2 looking in the left-hand direction. Fig. 4 is a similar view on the line 4 4 of Fig. 2 also looking in the left-hand direction, and Fig. 5 is a view in perspective of the device for retaining the swage-die in the different positions of adjustment thereof.

Before proceeding with a more detailed description it may be stated that in the form of my improvements herein shown I employ a head of special construction adapted to have passed thereinto a saw-blade the teeth of which are to be swaged, and in connection with said head I employ suitable means for preventing the same from rotating during the swaging operations, as well as other suitable means for preventing the swage from tilting out of position as it is moved from one saw-tooth to another by the operator, one of said means (the first) being of special construction and the other (the second) being secured to the head in a special way in conjunction with an arm against which rests when in its normal position the operating-lever for the swage-die. Said swage-die is of special construction, and means are provided for preventing the movements thereof from causing any wear upon the head, as will hereinafter be explained. I also employ an anvil-die of special construction, together with special means whereby the same may be moved forwardly or rearwardly within the head as occasion or necessity may require, further special means being present for holding this die downwardly to its work, yet permitting the same to be raised or lowered, as well as tipped forwardly or rearwardly, accordingly as the shape of the saw-teeth to be swaged may vary, said first-named means also operating to maintain the anvil-die always truly set or squared for effective coöperation with the swaging-die. Finally, I employ special means for locking the swage-die in the different positions of adjustment thereof, supported in part by the operating-lever for this die, suitable means being also employed for securing the swage upon the saw, and while I have herein represented my improvements in a certain preferred embodiment it will be understood, of course, that I do not limit myself thereto in precise detail, since immaterial changes therein may be made coming within the scope of my invention.

Reference being had to the drawings by the designating characters marked thereon, 1 represents the head of the swage, formed therethrough diametrally for about its lower half with a slot 2, in which are inserted the saw-teeth 3 to be swaged, said head being also formed above said slot with an opening 4, communicating at its lower end with the slot, and the forward and rearward walls 5 and 6 of which are parallel with each other and at a slight inclination forwardly from a vertical, (see Fig. 2,) the side walls 7 and 8 of the opening being also parallel with each other. (See Figs. 3 and 4.) The said head is of suitable longitudinal dimensions and is formed at one end of the base of the slot 2 therein with a boss 8, the purpose of which will be explained hereinafter, the upper surface 9 of the head being planed off at a slight forward and downward inclination, as shown.

Formed through the portions 10 of the head between which the slot 2 is formed are coinciding or registering openings 11, the walls of which are tapered slightly in the direction of the slot or inwardly, and in said openings are fitted bushings 12 of hardened steel or other suitable material, each having a socket or recess in its correspondingly-tapered outer surface receiving the inner end of a fastening-screw 13 therefor inserted through an opening extending inwardly from the peripheral surface of the corresponding portion 10 of the head, these screws tending to force and hold the bushings tightly in place. Said bushings 12 constitute bearings for the rotatable swage-die 13ª, which is inserted therethrough across the slot 2 in the head, as shown in Fig. 3, and which is constructed with duplicate journal members 14, (fitting in the bushings on either side of the slot 2,) separated from each other, as shown in Fig. 3, by the die proper, 13ᵇ, which is substantially elliptical in cross-section. The swage-die is provided at its ends with extensions 15 and 16, which are square or rectangular transversely, and the swage-die proper furnishes or presents twelve eccentric swaging beds or faces 17, Fig. 2, disposed diametrally opposite to each other, six of which are on either side of the longitudinal center of said die proper.

In the use of the swage the swage-die is first adjusted in its bearings to bring the first bed or face of the die proper into position for carrying out the operation of swaging the teeth of the saw, and when said bed or face has become worn the swage-die is adjusted inwardly to bring into the same position the second bed or face on the same side of said die proper. After the second face has become worn the swage-die is adjusted still farther inwardly to bring the third bed or face of the die proper into the same position previously occupied successively by the other two beds or faces. After this third bed or face has also become worn the swage-die may be turned in its bearings and the same operations carried out with respect to the three remaining swaging beds or faces on the same side of the die proper. Then the swage-die may be removed and reversed end for end and again inserted in its bearings and all of the operations herein previously described with reference to the swaging beds or faces on one side of the die proper again carried out in utilization of the beds or faces on the other side thereof. The swage-die has fitted to either the extension 15 or 16 thereof (according to the position of the die within its bearings in the head 1) the lower end of an operating hand-lever 18 therefor, and also applied to said extension so as not to turn thereon is a sleeve 19, formed circumferentially with a plurality of grooves 20 and having integral therewith a plate 21, formed with a segmental slot 22, in which works a screw 23, fitting in an opening therefor in said operating-lever 18. Coöperating with said sleeve 19 is an angle-arm 24, fastened to the head 1 by means of a screw 25, said arm having integral therewith a substantially semicircular member 26, adapted to enter the grooves 20 of the sleeve 19, and thus secure the swage-die 13 in either of the aforesaid positions to which it may be set or adjusted within the head, it being only necessary to remove said arm after first removing the screw 25 in order to enable the adjustments of the said swage-die to be altered, after which the die may be secured in place as before.

Fitting upon the surface 9 of the head 1 of the swage and closing the upper end of the opening 4 therein is a cap or block 27, which is adjustable back and forth by means of duplicate screws 28, extending through duplicate slots 29 therein and entering openings therefor in the head on opposite sides of said opening 4, said cap or block being formed or provided on its under side with a plug 30, fitting snugly between the side walls 7 and 8 of the opening 4, but being less in width than the distance between the forward and rearward walls 5 and 6 of said opening, thus to be capable of being carried forwardly or rearwardly within said opening with each corresponding adjustment of the said cap or block 27. The said plug 30 is formed centrally thereof from its lower end with a vertical recess or notch 31, of suitable depth, in which is located a vertically-movable block 32, having in the upper end thereof duplicate forwardly and rearwardly disposed sockets 33, in which are received the inner ends of screws 34, fitting in corresponding openings therefor in the cap or block 27, intermediate of the said screws 28. The lower end of said block is formed with a recess having angularly-disposed sides 35, and in which are snugly received three of the faces of a polygonal anvil-die 36, perferably in the form of an octagon, as shown clearly in Fig. 2. Said die is provided with a central pin 37, projecting beyond the same at the sides, and extending through corresponding vertically-elongated openings 38 in the sides of the plug 30, the ends of the pin preferably having sufficient frictional contact with the side walls 7 and 8 of the opening 4 in the head 1 to prevent said anvil-die from slipping downwardly out of place after adjustments of the same either downwardly or upwardly to secure the desired engagement thereof with the saw-teeth. To effect such adjustments, it is simply necessary to either partially remove the screws 34 or turn them down farther through the openings therefor in the cap or block 27, as will be apparent.

To adjust the anvil-die forwardly or rearwardly either to increase or diminish the bearing-contact thereof with the backs of the saw-teeth without having to grind the die for that purpose, it is only necessary to loosen the screws 28, whereupon the cap or block 27 may be moved forwardly or rearwardly upon the surface 9 of the head 1 the desired extent, carrying with it the plug 30, as well as the block 32, and the said anvil-die, said screws 28 being then again tightened to secure the severally-mentioned elements in place. By turning one or the other of the screws 34 farther inward the block 32 may be tipped either forwardly or rearwardly between the sides of the plug 30, thereby also tipping the anvil-die in the same direction, so as to cause the latter to assist in imparting finer points to the saw-teeth. As each corner or operative face of the anvil-die 36 becomes worn said die may be moved downwardly clear of the sides of the recess in the lower end of the block 32 and then turned to bring the next corner or face into operative position, and so on until all of said corners or faces at one side of said die have been utilized. Then the anvil-die can be removed and reversed side for side, thus presenting an equal number of new corners or faces which may be employed in the same manner as the first, thereby deriving sixteen working corners or faces therefrom.

The portions 10 of the head between which is the slot 2 are formed therethrough with corresponding openings 39, having right and left hand screw-threads, and in which work right and left hand screws 40 and 41, the latter having a polygonal extension 42, on which is fitted one end of an operating hand-lever 43. The inner ends of these screws extend into the slot 2, and in the use of the swage upon a saw-blade the screw 40 is usually positively set at a certain adjustment, whereas the screw 41 is first operated by its hand-lever to be turned outwardly to enable the swage to be properly placed, and then preparatory to the actual swaging of each saw-tooth said screw 41 is operated to be turned inwardly, so as to cause the blade of the saw to be firmly clamped between the ends of the two said screws. If desired, the inner ends of said screws may be milled or roughened or otherwise constructed to assist in preventing the slipping of the swage upon the saw-blade.

Extending rearwardly of the head 1 is a bracket-arm 44, having integral with the sides of the inner end portion thereof duplicate segmental members 45, formed with slots 46, through which extend the threaded portions of headed screws 47, which are received in openings therefor formed from the peripheral surfaces of the portions 10 of the head 1, said bracket-arm thus being adjustable circumferentially of the head by simply loosening the screws 47 and moving the said segmental members either upwardly or downwardly, after which the screws may be again tightened. The purpose of these adjustments of the bracket-arm is to alter the position of the head 1 upon the saw-blade, thus to enable the desired pitch to be imparted to the saw-teeth by the dies forwardly or backwardly, as may be desired. Secured to the under side of the bracket 44 at 48 is a flat guide-spring 49, which rests on the saw-teeth when the swage is on the saw, and coöperating with the said guide-spring is a coiled spring 50, housed in a recess 51 near the free end of the bracket and exerting its tension between the guide-spring and the upper side of said recess. Extending through an opening therefor in the upper end of a boss 54, integral with the end of the bracket, is a pin 52, which is received within the coils of said spring 50. (See Fig. 1.) Pendent from the boss 54 are duplicate guide-wings 55, having a space 56 between them, receiving the saw-teeth, and through which extends the free portion of said flat guide-spring 49, it being in this way that the swage is held and guided upon the swage-block. It will thus be seen that whenever the lever 18 is drawn forwardly (right-hand direction, Fig. 1) to operate the swaging-die $13^a$ the said springs 49 and 50, through the intermediacy of the bracket 44, will furnish a cushioning resistance to the whole structure, while the head 1 will be prevented from turning with the swaging-die by the screw 52, the lower end of which is brought into contact with the upper surface of the guide-spring 49, which, as before stated, rests upon the saw-teeth. The wings 55 by embracing the sides of the saw-teeth firmly brace them while they are being swaged, and they also prevent the structure from tilting laterally of the saw-blade. A shoe 56 is secured at 57 to the right-angled member $57^a$ of an arm 58, the inner end of which is secured to the head 1 by means of a headed bolt 59, extending through an opening (not shown) therefor in the boss 8 of said head. Said shoe rests upon the saw-teeth, over which it is brought by the successive movements of the swage upon the saw-blade from one tooth of the saw to another and prevents tilting of the swage during such movements. Also held upon the bolt 59 at the opposite side of the head 1 and secured in place by a nut 60 is an angle-arm 61, the member 62 of which forms a rest or support for the operating hand-lever for the swaging-die when said lever is pushed forward.

By taking hold of the lever 18 with one hand and the lever 43 with the other the operator can without removing his hands from said levers first tighten the clamping-screws 40 and 41 upon the saw-blade (after properly locating the swage upon said blade) by pushing said lever 43 in one direction, and then by pulling upon the lever 18 in the opposite direction the swaging-die will be operated, as hereinbefore described. Then by reversing the movements of the operating-levers the clamping-screws will release the saw-blade and the swaging-die will be carried back ready for the next operation, and so on.

The construction and operation of my invention will thus be clearly understood without further explanation, it being mentioned, however, that in addition to its other functions the plug 30 serves to hold the anvil-die in true working relation to the beds or faces of the swaging-die, thereby giving the best results in practice.

It will be seen that in virtue of the means (bolt 59 and nut 60) employed for securing the angled members of the arms 58 and 61 in proper position within the boss 8 of the head 1 of the swage the said head has imparted thereto considerable strength over and above what it would have were the said angled members secured in position in an opening therefor formed directly through the head from end to end.

I have herein referred to the levers 18 and 43 as being operated in reverse directions by which to first effect the tightening of the clamping-screws upon the sides of the saw-blade and then carrying out the swaging operation; but it will be understood that my invention comprehends the use of such levers as operated in the same direction for effecting the same result.

Having thus described my invention, I claim as new and desire to secure by Letters Patent—

1. A saw-swage comprising a head having a slot therethrough from the peripheral surface thereof and formed from its upper surface with an opening leading to the slot, a rotatable swaging-die supported by the head and extending across the slot, a rotatable anvil-die provided with a central pin projecting from the sides thereof and having its ends frictionally engaging with opposite sides of said opening, to thereby support this die in operative position, and means for adjusting the said anvil-die forwardly or rearwardly with reference to said swaging-die.

2. A saw-swage comprising a head having a slot therethrough from the peripheral surface thereof and formed from its upper surface with an opening leading to the slot, a rotatable swaging-die supported by the head and extending across the slot, a rotatable anvil-die provided with a central pin projecting from the sides thereof and having its ends frictionally engaging with opposite sides of said opening, to thereby support this die in operative position, and means whereby the anvil-die may be raised or lowered relatively to said swaging-die.

3. A saw-swage comprising a head having a slot therethrough from the peripheral surface thereof and formed from its upper surface with an opening leading to the slot, a rotatable swaging-die supported by the head and extending across the slot, a rotatable anvil-die provided with a central pin projecting from the sides thereof and having its ends frictionally engaging with opposite sides of said opening, to thereby support the anvil-die forwardly or rearwardly with reference to said swaging-die, and means for truing the anvil-die with the swaging-die.

4. A saw-swage comprising a head having a slot therethrough from the peripheral surface thereof and formed from its upper surface with an opening leading to the slot, a rotatable swaging-die supported by the head and extending across the slot, a rotatable polygonal anvil-die provided with a central pin projecting from the sides thereof and having its ends frictionally engaging with opposite sides of said opening, to thereby support this die in operative position, and means whereby the anvil-die may be raised or lowered relatively to said swaging-die.

5. A saw-swage comprising a head having a slot therethrough from the peripheral surface thereof and formed from its upper surface with an opening leading to the slot, a rotatable swaging-die supported by the head and extending across the slot, a rotatable anvil-die provided with a central pin projecting from the sides thereof and having its ends frictionally engaging with opposite sides of said opening to thereby support this die in position, means whereby the anvil-die may be raised or lowered relatively to said swaging-die, and means whereby the anvil-die may be tipped forwardly or rearwardly with reference to the swaging-die, embodying a cap adjustably secured to said upper surface of the head, a plug rigid with the cap, having a recess therein, a block provided with sockets, and screws extending through the cap and entering said sockets.

6. A saw-swage comprising a head having a slot therethrough from the peripheral surface thereof and formed from its upper surface with an opening leading to the slot, a rotatable swaging-die supported by the head and extending across the slot, a rotatable anvil-die provided with a central pin projecting from the sides thereof and having its ends frictionally engaging with opposite sides of said opening to thereby support this die in operative position, means for adjusting the anvil-die forwardly or rearwardly with reference to the swaging-die, embodying a forwardly and rearwardly adjustable cap closing the upper end of the opening, a socket having a recess therein and extending within the opening, and a vertically-adjustable block supported in the recess of the socket and engaging with faces of the anvil-die.

In testimony whereof I have signed my name to this specification in the presence of two subscribing witnesses.

SAMUEL TIMOTHY LIPSEY.

Witnesses:
F. L. SIAU,
AMASA HARVEY.